United States Patent [19]

Pelrine et al.

[11] 4,222,855

[45] Sep. 16, 1980

[54] PRODUCTION OF HIGH VISCOSITY INDEX LUBRICATING OIL STOCK

[75] Inventors: Bruce P. Pelrine, Trenton; Nai Y. Chen, Titusville, both of N.J.

[73] Assignee: Mobil Oil Corporation, New York, N.Y.

[21] Appl. No.: 23,855

[22] Filed: Mar. 26, 1979

[51] Int. Cl.$^3$ .............. C10G 11/05; C10G 47/16
[52] U.S. Cl. ............................ 208/111; 208/18; 208/120; 423/428
[58] Field of Search ................. 208/111, 18, 120

[56] References Cited

U.S. PATENT DOCUMENTS

| | | | |
|---|---|---|---|
| 3,668,113 | 6/1972 | Burbidge et al. | 208/97 |
| 3,700,585 | 10/1972 | Chen et al. | 208/111 |
| 3,702,886 | 11/1972 | Argauer et al. | 423/328 |
| 3,755,138 | 8/1973 | Chen et al. | 208/33 |
| 3,804,746 | 4/1974 | Chu | 208/111 |
| 3,968,024 | 7/1976 | Gorring et al. | 208/111 |
| 4,081,490 | 3/1978 | Plank et al. | 208/111 X |
| 4,104,151 | 8/1978 | Rubin et al. | 208/111 |

Primary Examiner—Delbert E. Gantz
Assistant Examiner—G. E. Schmitkons
Attorney, Agent, or Firm—Charles A. Huggett; Raymond W. Barclay

[57] ABSTRACT

Waxy hydrocarbon oils, e.g., of petroleum origin, boiling within the approximate range of 450° to 1050° F. are catalytically dewaxed utilizing a catalyst comprising a crystalline aluminosilicate zeolite possessing particularly characterized pore openings, such as, for example, ZSM-23 or ZSM-35, which may be associated with a hydrogenation metal.

12 Claims, No Drawings

PRODUCTION OF HIGH VISCOSITY INDEX LUBRICATING OIL STOCK

BACKGROUND OF THE INVENTION

1. Field of the Invention

This invention is concerned with the manufacture of high quality lubricating oils, and in particular with lubricating oils derived from petroleum distillate fractions. It is especially directed to the preparation of low pour point lubricating oils that have a high V.I. (V.I. will be used herein to denote "viscosity index") from crude, oils of high wax content. This invention is specifically directed to catalytically dewaxing a waxy distillate lubricating oil utilizing a crystalline aluminosilicate zeolite catalyst of particularly defined pore size characteristics to obtain a lubricating oil of low pour point and of high V.I.

2. Discussion of Prior Art

Refining suitable petroleum crude oils to obtain a variety of lubricating oils which function effectively in diverse environments has become a highly developed and complex art. Although the broad principles involved in refining are qualitatively understood, the art is encumbered by quantitative uncertainities which require considerable resort to empiricism in practical refining. Underlying these quantitative uncertainties is the complexity of the molecular constitution of lubricating oils. Because lubricating oils for the most part are based on petroleum fractions boiling above about 450° F., the molecular weight of the hydrocarbon constituents is high and these constituents display almost all conceivable structure types. This complexity and its consequences are referred to in well known treatises, such as, for example, in "Petroleum Refinery Engineering," by W. L. Nelson, McGraw Hill Book Company, Inc., New York, N.Y., 1958 (Fourth Edition).

In general, the basic premise in lubricant refining is that a suitable crude oil, as shown by experience or by assay, contains a quantity of lubricant stock having a predetermined set of properties such as, for example, appropriate viscosity, oxidation stability, and maintenance of fluidity at low temperatures. The process of refining to isolate that lubricant stock consists of a set of subtractive unit operations which removes the unwanted components. The most important of these unit operations include distillation, solvent refining, and dewaxing, which basically are physical separation processes in the sense that if all the separated fractions were recombined one would reconstitute the crude oil.

A refined lubricant stock may be used as such as a lubricant, or it may be blended with another refined lubricant stock having different properties. Or, the refined lubricant stock, prior to use as a lubricant, may be compounded with one or more additives which function, for example, as antioxidants, extreme pressure additives, and V.I. improvers.

For the preparation of a high grade distillate lubricating oil stock, the current practice is to vacuum distill an atmospheric tower residuum from an appropriate crude oil as the first step. This step provides one or more raw stocks within the boiling range of about 450° to 1050° F. After preparation of a raw stock of suitable boiling range, it is extracted with a solvent, e.g., furfural, phenol, sulfalane, or chlorex, which is selective for aromatic hydrocarbons, and which removes undesirable components. The raffinate from solvent refining is then dewaxed, for example by admixing with a solvent such as a blend of methyl ethyl ketone and toluene. The mixture is chilled to induce crystallization of the paraffin waxes which are then separated from the raffinate. Sufficient quantities of wax are removed to provide the desired pour point for the raffinate.

Other processes such as hydrofinishing or clay percolation may be used if needed to reduce the nitrogen and sulfur content or improve the color of the lubricating oil stock.

Viscosity index (V.I.) is a quality parameter of considerable importance for distillate lubricating oils to be used in automotive engines and aircraft engines which are subject to wide variations in temperature. This Index indicates the rate of change of viscosity with temperature. A high viscosity index of 100 indicates an oil that does not tend to become viscous at low temperature or become thin at high temperatures. Measurement of the Saybolt Universal Viscosity of an oil at 100° and 210° F., and referral to correlations, provides a measure of the V.I. of the oil. For purposes of the present invention, whenever V.I. is referred to it is meant the V.I. as noted in the Viscosity Index tabulations of the ASTM (D567), published by ASTM, 1916 Race St., Philadelphia 3, Pa., or equivalent.

To prepare high V.I. automotive and aircraft oils the refiner usually selects a crude oil relatively rich in paraffinic hydrocarbons, since experience has shown that crudes poor in paraffins, such as those commonly termed "naphthene-base" crudes yield little or no refined stock having a V.I. above about 40. Suitable stocks for high V.I. oils, however, also contain substantial quantities of waxes which result in solvent-refined lubricating oil stocks of high pour point. Thus, in general, the refining of crude oil to prepare acceptable high V.I. distillate stocks ordinarily includes dewaxing to reduce the pour point.

In recent years, catalytic techniques have become available for dewaxing of petroleum stocks. A process of that nature developed by British Petroleum is described in The Oil and Gas Journal dated Jan. 6, 1975, at pages 69–73. See also U.S. Pat. No. 3,668,113.

In U.S. Pat. No. Re. 28,398 to Chen, et al. is described a process for catalytic dewaxing with a catalyst comprising zeolite ZSM-5. Such processes combined with catalytic hydrofinishing is described in U.S. Pat. No. 3,894,938. U.S. Pat. No. 3,755,138 to Chen et al. describes a process for mild solvent dewaxing to remove high quality wax from a lube stock, which is then catalytically dewaxed to specification pour point. The entire contents of these patents are herein incorporated by reference.

It is interesting to note that catalytic dewaxing, unlike prior-art dewaxing processes, although subtractive, is not a physical process but rather depends on transforming the straight chain and other waxy paraffins to non-wax materials. The process, however, is more economical and thus of industrial interest, even though at least some loss of saleable wax is inherent. Commercial interest in catalytic dewaxing is evidence of the need for more efficient refinery processes to produce low pour point lubricants.

SUMMARY OF THE INVENTION

It has now been found that catalytic dewaxing of a distillate petroleum fraction boiling within the approximate range of 450° to 1050° F. is advantageously achieved by utilizing as catalyst the hereinbelow described crystalline aluminosilicate zeolite of particularly defined pore size characteristics under specified process conditions. The crystalline aluminosilicate zeolite catalyst used in the process of this invention has unexpectedly been found to provide a lube stock product having a V.I. higher than those obtained with the crystalline aluminosilicate zeolites heretofore employed. The crystalline aluminosilicate zeolites used in the present invention possess particularly characterized pore openings defined by: (1) a ratio of sorption of n-hexane to o-xylene, on a volume percent basis, of greater than 3, which sorption is determined at a $P/P_o$ of 0.1 and at a temperature of 50° C. for n-hexane and 80° C. for o-xylene and (2) by the ability of selectively cracking 3-methylpentane in preference to the doubly branched 2,3-dimethylbutane at 1000° F. and 1 atmosphere pressure from a 1/1/1 weight ratio mixture of n-hexane/3-methyl-pentane/2,3-dimethylbutane (DMB) mixture, with the ratio of rate constants $k_{3MP}/k_{DMB}$ determined at a temperature of 1000° F. being in excess of about 2.

The expression of "$P/P_o$," as utilized herein, is accorded its usual significance as described in the literature, for example, in "The Dynamical Character of Adsorption" by J. H. deBoer, 2nd Edition, Oxford University Press (1968) and is the relative pressure defined as the ratio of the partial pressure of sorbate to the vapor pressure of sorbate at the temperature of sorption. The ration of the rate constants, $k_{3MP}/k_{DMB}$, are determined from 1st order kinetics, in the usual manner, by the following equation:

$$k = (1/T_c) \ln (1/1-\epsilon)$$

where k is the rate constant for each component, $T_c$ is the contact time and $\epsilon$ is the fractional conversion of each component.

The recovered dewaxed oil so produced has a V.I. considerably higher than that obtained with ZSM-5 catalyst described in the aforementioned prior art. In a particular preferred embodiment, the crystalline aluminosilicate zeolite utilized in the process of this invention is in the hydrogen form and may be employed in conjunction with a hydrogenation component, such as platinum, palladium or zinc, in the presence of hydrogen.

DESCRIPTION OF SPECIFIC EMBODIMENTS

In accordance with the process of this invention, high V.I. lube stocks are provided by catalytically dewaxing a petroleum fraction boiling within the approximate range of 450° to 1050° F. and preferably from about 600° to about 1050° F. by contacting the same with a crystalline aluminosilicate zeolite possessing particularly characterized pore openings defined by: (1) a ratio of sorption of n-hexane to o-xylene, on a volume percent basis, of greater than 3, which sorption is determined at a $P/P_o$ of 0.1 and at a temperature of 50° C. for n-hexane and 80° C. for o-xylene and (2) by the ability of selectively cracking 3-methylpentane in preference to the doubly branched 2,3-dimethylbutane at 1000° F. and 1 atmosphere pressure from a 1/1/1 weight ratio mixture of n-hexane/3-methylpentane/2.3-dimethylbutane mxiture, with the ratio of rate constants $k_{3MP}/k_{DMB}$, determined at a temperature of 1000° F., being in excess of about 2.

The charge stock used in the process of this invention includes hydrocracked petroleum oils boiling within the aforenoted range as well as other processed heavy oils whether derived from tar sands, coal, or from other sources. The boiling points herein referred to are boiling points at atmospheric pressure, and may be determined by vacuum assay in the manner known to those skilled in the art.

In a preferred embodiment of this invention a viscous distillate fraction of crude petroleum oil isolated by vacuum distillation of a reduced crude from atmospheric distillation is solvent refined by counter current extraction with at least an equal volume (100 vol.%) of a selective solvent such as furfural. It is preferred to use 1.5 to 2.5 volumes of solvent per volume of oil. The raffinate is subjected to catalytic dewaxing by mixing with hydrogen and contacting at about 500° to about 850° F. with a catalyst comprising the above described crystalline aluminosilicate zeolite, preferably containing a hydrogenation component. The catalytic dewaxing is conducted at a liquid hourly space velocity (LHSV) of 0.1 to 10 volumes of charge oil per volume of catalyst per hour.

In some instances, it may be desirable to partially dewax the solvent-refined stock by conventional solvent dewaxing techniques prior to catalytic dewaxing. The higher melting point waxes so removed are those of greater hardness and higher market value than the waxes removed in taking the product to a still lower pour point.

In general, hydrodewaxing conditions include a temperature between about 500° and about 850° F., a pressure between about 100 and about 3000 psig and preferably between about 200 and about 1000 psig. The liquid hourly space velocity is generally between about 0.1 and about 10 and preferably between about 0.5 and about 4 and the hydrogen to feedstock ratio is generally between about 400 and about 8000 and preferably between about 800 and about 4000 standard cubic feet (scf) of hydrogen per barrel of feed.

The catalytic dewaxing process of this invention may be conducted by contacting the feed to be dewaxed with a fixed stationary bed of the defined crystalline aluminosilicate zeolite catalyst, or with a transport bed, as desired. A simple and therefore preferred configuration is a trickle-bed operation in which the feed is allowed to trickle through a stationary fixed bed, preferably in the presence of hydrogen. With such configuration, it is of considerable importance in order to obtain the benefits of this invention to initiate the reaction with fresh catalyst at a temperature of less than 600° F. This temperature is of course raised as the catalyst ages, in order to maintain catalytic activity. In general, the run is terminated at an end-of-run temperature of about 850° F., at which time the catalyst may be regenerated by contact at elevated temperature with hydrogen gas, for example.

The crystalline aluminosilicate zeolite catalysts utilized herein may be either natural, synthetic or mixtures thereof, providing the same possess the above noted requisite pore size characteristics. Thus, the zeolites useful as catalysts in the present process may be either pure zeolites, i.e., unmodified zeolites or zeolites which have been modified to provide the requisite pore size characteristics. Thus, it is contemplated that zeolites with pore openings larger than those satisfying the above noted conditions may be modified to reduce such pore openings by suitable impregnation techniques.

Particularly preferred of the crystalline aluminosilicate zeolites employed herein are ZSM-23 and ZSM-35. These zeolites, which are characterized by pore openings smaller than those of ZSM-5, ZSM-11 or ZSM-12 and larger than those of erionite or zeolite ZK-5, have been found to provide superior catalysts in dewaxing waxy hydrocarbon oils to high viscosity index lube basestocks.

ZSM-23 is described in U.S. Pat. No. 4,076,842, the entire contents of which are incorporated herein by reference.

ZSM-35 is described in U.S. Pat. No. 4,016,245, the entire contents of which are incorporated herein by reference.

In the following table, the sorption ratio (volume %) of n-hexane/o-xylene, at a temperature of 50° C. and $P/P_o$ of 0.1 for the sorption of n-hexane and 80° C. and $P/P_o$ of 0.1 for o-xylene together with the rate constant ratio $k_{3MP}/k_{DMB}$, above defined, are shown for ZSM-23, ZSM-35, ZSM-5 and ZSM-11:

TABLE I

|  | ZSM-23 | ZSM-35 | ZSM-5 | ZSM-11 |
|---|---|---|---|---|
| n-hexane/o-xylene | 3.3 | 5.8 | 2.5 | 1.6 |
| $k_{3MP}/k_{DMB}$ | 11 | 6.3 | 1.5 | 1.5 |

It will be evident from the above that ZSM-23 and ZSM-35 satisfy the criteria for zeolites utilized in the process of this invention of having a n-hexane/o-xylene sorption ratio under the specified conditions of greater than 3 and a $k_{3MP}/k_{DMB}$ ratio of in excess of about 2, whereas ZSM-5 and ZSM-11 do not fulfill these conditions.

The original cations associated with the crystalline aluminosilicate zeolites utilized herein may be replaced by a wide variety of other cations according to techniques well known in the art. Typical replacing cations include hydrogen, ammonium and metal cations, including mixtures of the same. Of the replacing metallic cations, particular preference is given to cations of metals such as rare earth metals, manganese, calcium, as well as metals of Group II of the Periodic Table, e.g., zinc, and Group VIII of the Periodic Table, e.g., nickel, platinum and palladium.

Typical ion exchange techniques would be to contact the particular zeolite with a salt of the desired replacing cation. Although a wide variety of salts can be employed, particular preference is given to chlorides, nitrates and sulfates.

Representative in exchange techniques are disclosed in a wide variety of patents including U.S. Pat. Nos. 3,140,249; 3,140,251; and 3,140,253.

Following contact with solution of the desired replacing cation, the zeolite is then preferably washed with water and dried at a temperature ranging from 150° F. to about 600° F. and thereafter calcined in air or other inert gas at temperatures ranging from about 500° F. to 1500° F. for periods of time ranging from 1 to 48 hours or more. It has been further found that catalyst of improved selectivity and other beneficial properties may be obtained by subjecting the zeolite to treatment with steam at elevated temperatures ranging from 800° F. to 1500° F. and preferably 1000° F. and 1400° F. The treatment may be accomplished in atmospheres of 100% steam of an atmosphere consisting of steam and a gas which is substantially inert to the zeolites.

A similar treatment can be accomplished at lower temperatures and elevated pressure, e.g., 350°–700° F. at 10 to about 200 atmospheres. The crystalline aluminosilicate zeolite utilized in the process of this invention is desirably employed in intimate combination with a hydrogenation component in an amount between about 0.1 and about 5 weight percent, such as tungsten, vanadium, zinc, molybdenum, rhenium, nickel, cobalt, chromium, manganese, or a noble metal such as platinum or palladium. Such component can be exchanged into the composition, impregnated thereon or physically intimately admixed therewith. Such component can be impregnated in or onto the zeolite such as, for example, by in the case of platinum, by treating the zeolite with a platinum metal-containing ion. Thus, suitable platinum compounds include chloroplatinic acid, platinous chloride and various compounds containing the platinum ammine complex. Platinum, palladium and zinc are preferred hydrogenation components.

The compounds of the useful platinum or other metals can be divided into compounds in which the metal is present in the cation of the compound and compounds in which it is present in the anion of the compound. Both types of compounds which contain the metal in the ionic state can be used. A solution in which platinum metals are in the form of a cation or cationic complex, e.g., $Pt(NH_2)_4Cl_2$ is particuarly useful.

Prior to use, the zeolites should be dehydrated at least partially. This can be done by heating to a temperature in the range of 200° to 600° C. in an inert atmosphere, such as air, nitrogen, etc. and at atmospheric or subatmospheric pressures for between 1 and 48 hours. Dehydration can also be performed at lower temperatures merely by using a vacuum, but a longer time is required to obtain sufficient amount of dehydration.

The following examples will serve to illustrate the process of the invention without limiting the same:

EXAMPLE 1

A sample of HZSM-23 in the amount of 2.80 grams was used to dewax a heavy neutral raffinate stock having the following properties:

| API Gravity | 29.1 |
|---|---|
| Pour Point | >115° F. |
| Viscosity | |
| KV at 130° F. | 38.47 centistokes |
| KV at 210° F. | 9.91 centistokes |
| Boiling Range | 678° F.–960° F. (95% point) |

Contact between the charge stock and zeolite catalyst was effected at a temperature of 600° F. and a pressure of 415 psig, employing a liquid hourly space velocity of 1.3, using 2500 SCF of hydrogen per barrel of charge stock for a period of 1 day. The resulting liquid product had a pour point of 35° F. and a V.I. of 98.

EXAMPLE 2

A sample of HZSM-23 in the amount of 2.80 grams was used to dewax the heavy neutral raffinate described in Example 1.

Contact between the charge stock and zeolite catalyst in this instance was maintained at a temperature of 700° F. and a pressure of 415 psig, using a liquid hourly space velocity of 1.0, for a period of 1 day after 6 days on stream at a temperature of 600°–700° F. The resulting liquid product had a pour point of 40° F. and a V.I. of 101.

EXAMPLE 3

A sample of HZSM-23 extrudate containing 65 weight percent of the zeolite and 35 weight percent of alumina binder was steamed at a temperature of 800° F., a pressure of 0 psig with 100 percent steam for 16 hours.

Contact between the resulting steamed HZSM-23 extrudate and the heavy material raffinate described in Example 1 was maintained at a temperature of 610° F. and a pressure of 415 psig, using a liquid hourly space velocity of 0.9 for a period of 1 day. The resulting liquid product had a pour point of 40° F. and a V.I. of 97.

EXAMPLE 4

Contact between the steamed HZSM-23 extrudate and heavy neutral raffinate was made as described in Example 3 but at a temperature of 700° F. and a liquid hourly space velocity of 0.6 for 3 days, after 3 days on stream at a temperature of 610°-700° F., to yield a liquid product having a pour point of 40° F. and a V.I. of 103.

EXAMPLE 5

A sample of HZSM-23 in the amount of 3.47 grams was impregnated with palladium by contact with a solution containing 0.0351 grams palladium chloride in 20 cc concentrated ammonium hydroxide to yield a product containing 0.6 weight percent of palladium.

Contact between the catalyst of 0.6% Pd HZSM-23 and the heavy raffinate described in Example 1 was maintained at a temperature of 600° F., a pressure of 415 psig, using a liquid hourly space velocity of 1.1 for a period of 1 day. The resulting liquid product had a pour point of 40° F. and a V.I. of 99.

EXAMPLE 6

Contact between the 0.6% Pd HZSM-23 catalyst and heavy neutral raffinate was made as described in Example 5 but at a temperature of 700° F. and a liquid hourly space velocity of 1.0 for 1 day, after 3 days on stream at a temperature of 600°-650° F., to yield a liquid product having a pour point of 35° F. and a V.I. of 98.

EXAMPLE 7

Contact between the 0.6% Pd HZSM-23 catalyst and heavy neutral raffinate was made as described in Example 5 but at a temperature of 700° F., a pressure of 750 psig, using a liquid hourly space velocity of 1.0 for a period of 1 day, after 4 days on stream at a temperature of 600°-700° F. The resulting liquid product had a pour point of 35° F. and a V.I. of 99.

EXAMPLE 8

Contact between the 0.6% Pd HZSM-23 catalyst and heavy neutral raffinate was made under the temperature and pressure conditions of Example 7 but at a liquid hourly space velocity of 0.5 for a period of 2 days, after 5 days on a stream at a temperature of 600°-700° F., to yield a product having a pour point of 25° F. and a V.I. of 99.

EXAMPLE 9

A sample of HZSM-23 in the amount of 2.717 grams was impregnated by contact with a 0.76 weight percent aqueous solution of zinc to yield a product containing 2 weight percent of zinc.

Contact between the catalyst of 2% Zn HZSM-23 and the heavy raffinate above described was maintained at a temperature of 600° F., a pressure of 410 psig, using a liquid hourly space velocity of 1.1 for 1 day. The resulting liquid product had a pour point of 35° F. and a V.I. of 97.

EXAMPLE 10

Contact between the 2% Zn HZSM-23 catalyst and heavy neutral raffinate was made as described in Example 9 but at a temperature of 700° F. for a period of 2 days, after 3 days on stream at a temperature of 600°-650° F., to yield a liquid product having a pour point of 35 and a V.I. of 97.

EXAMPLE 11

A sample of HZSM-35 in the amount of 2.20 grams was used to dewax a light neutral raffinate stock having the following properties:

| A.P.I. Gravity | 32.0 |
| --- | --- |
| Pour Point | 95° F. |
| Viscosity | |
| KV at 130° F. | 14.27 centistokes |
| KV at 210° F. | 4.81 centistokes |
| Boiling Range | 663°-847° F. (95% point) |

Contact between the above stock and zeolite catalyst was effected at a temperature of 600° F. and a pressure of 420 psig, employing a liquid hourly space velocity of 1.0 for a period of 1 day. The resulting liquid product had a pour point of 20° F. and a V.I. of 77.

EXAMPLE 12

Contact between the HZSM-35 catalyst and light neutral raffinate was made as described in Example 11 but at a temperature of 650° F. for a period of 2 days, after 1 day on stream under the conditions of Example 1, to yield a liquid product having a pour point of 20° F. and a V.I. of 100.

EXAMPLE 13

Contact between the HZSM-35 catalyst and light neutral raffinate was made as described in Example 11 but at a temperature of 700° F., a liquid hourly space velocity of 1.1 for a period of 1 day, after 3 days on stream of a temperature of 600°-650° F., to yield a liquid having a pour point of 15° F. and a V.I. of 101.

EXAMPLE 14

Contact between the HZSM-35 catalyst and light neutral raffinate was made as described in Example 11 but at a liquid hourly space velocity of 1.1 for a period of 1 day, after 4 days on stream of a temperature of 600°-700° F., to yield a liquid product having a pour point of 25° F. and a V.I. of 103.

EXAMPLE 15

Contact between the HZSM-35 catalyst and light neutral raffinate was made as described in Example 11 but at a pressure of 410 psig and as liquid hourly space velocity of 1.1 for a period of 1 day, after 11 days on stream at a temperature of 600°-700° F., to yield a liquid product having a pour point of 25° F. and a V.I. of 104.

EXAMPLE 16

A sample of HZSM-5 in the amount of 2.51 grams was exchanged with nickel by contact with a solution of nickel nitrate to yield a product containing 0.7 weight percent of nickel.

Contact between the catalyst of Ni HZSM-5 and the light neutral raffinate described in Example 11 was maintained at a temperature of 540° F., a pressure of 420 psig, using a liquid hourly space velocity of 1.0 for a period of 1 day. The resulting product had a pour point of 25° F. and a V.I. of 89.

EXAMPLE 17

Contact between the 0.7% NiHZSM-5 catalyst and light neutral raffinate was made as described in Example 16 but at a temperature of 600° F., a pressure of 400 psig for a period of 1 day, after 6 days on stream at a temperature of 600°–700° F., to yield a liquid product having a pour point of 40° F. and a V.I. 93.

The results of the above examples are summarized in Table II below:

TABLE II

| Example | Catalyst | Feed | Pressure psig | Temperature °F. | LHSV | Pour Point °F. | V.I. | Total Time on Stream Days |
|---|---|---|---|---|---|---|---|---|
| 1 | HZSM-23 | Heavy Neutral Raffinate | 415 | 600 | 1.3 | 35 | 98 | 1 |
| 2 | HZSM-23 | Heavy Neutral Raffinate | 415 | 700 | 1.0 | 40 | 101 | 7 |
| 3 | Steamed HZSM-23 Extrudate | Heavy Neutral Raffinate | 415 | 610 | 0.9 | 40 | 97 | 1 |
| 4 | Steamed HZSM-23 Extrudate | Heavy Neutral Raffinate | 415 | 700 | 0.6 | 40 | 103 | 6 |
| 5 | 0.6% PdHZSM-23 | Heavy Neutral Raffinate | 415 | 600 | 1.1 | 40 | 99 | 1 |
| 6 | 0.6% PdHZSM-23 | Heavy Neutral Raffinate | 415 | 700 | 1.0 | 35 | 98 | 4 |
| 7 | 0.6% PdHZSM-23 | Heavy Neutral Raffinate | 750 | 700 | 1.0 | 35 | 99 | 5 |
| 8 | 0.6% PdHZSM-23 | Heavy Neutral Raffinate | 750 | 700 | 0.5 | 25 | 99 | 7 |
| 9 | 2% Zn HZSM-23 | Heavy Neutral Raffinate | 410 | 600 | 1.1 | 35 | 97 | 1 |
| 10 | 2% Zn HZSM-23 | Heavy Neutral Raffinate | 410 | 700 | 1.1 | 35 | 97 | 5 |
| 11 | HZSM-35 | Light Neutral | 420 | 600 | 1.0 | 20 | 77 | 1 |
| 12 | HZSM-35 | Light Neutral | 420 | 650 | 1.0 | 20 | 100 | 3 |
| 13 | HZSM-35 | Light Neutral | 420 | 700 | 1.1 | 15 | 101 | 4 |
| 14 | HZSM-35 | Light Neutral | 420 | 600 | 1.1 | 25 | 103 | 5 |
| 15 | HZSM-35 | Light Neutral | 410 | 600 | 1.1 | 25 | 104 | 12 |
| 16 | NiHZSM-5 | Light Neutral | 420 | 540 | 1.0 | 25 | 89 | 1 |
| 17 | NiHZSM-5 | Light Neutral | 420 | 600 | 1.0 | 40 | 93 | 7 |

From the above table, it will be seen that the V.I. of the dewaxed product utilizing ZSM-23 or ZSM-35 is significantly higher than obtained with ZSM-5. It is further to be noted that ZSM-35, in particular, afforded a very stable operation between day 5 and day 12, indicating a low catalyst deactivation rate and the products from ZSM-35 also have a lower pour point as compared to ZSM-5.

What is claimed is:

1. A process for catalytically dewaxing a waxy hydrocarbon fraction boiling within the approximate range of 450° to 1050° F. to provide a lubricating oil of high viscosity index which comprises contacting said fraction at a temperature between about 500° and about 850° F., a pressure between about 100 and about 3000 psig at a liquid hourly space velocity between about 0.1 and about 10 with a catalyst comprising a crystalline aluminosilicate zeolite possessing particularly characterized pore openings defined by (1) a ratio of sorption of n-hexane to o-xylene, on a volume percent basis, of greater than 3, which sorption is determined at a $P/P_o$ of 0.1 and at a temperature of 50° C. for n-hexane and 80° C. for o-xylene and (2) by the ability of selectively cracking 3-methylpentane in preference to 2,3-dimethylbutane at 1000° F. and 1 atmosphere pressure from a 1/1/1 weight ratio mixture of n-hexane/3-methylpentane/2,3-dimethylbutane mixture with the ratio of rate constants $k_{3MP}/k_{DMB}$ being in excess of about 2 and recovering a dewaxed oil product.

2. The process of claim 1 wherein said contacting is effected in the presence of hydrogen and said zeolite is associated with a hydrogenation metal.

3. The process of claim 2 wherein said hydrogenation metal is selected from the group consisting of platinum, palladium and zinc.

4. The process of claim 1 wherein said zeolite is ZSM-23.

5. The process of claim 1 wherein said zeolite is ZSM-35.

6. The process of claim 1 wherein said waxy hydrocarbon is a waxy solvent-refined stock.

7. The process of claim 1 carried out in the presence of hydrogen, wherein the amount of hydrogen is between about 400 and about 8000 standard cubic feet of hydrogen per barrel of feedstock.

8. The process of claim 1 wherein said pressure is between about 200 and about 1000 psig and said liquid hourly space velocity is between about 0.5 and about 4.

9. The process of claim 1 wherein said zeolite is HZSM-23.

10. The process of claim 1 wherein said zeolite is HZSM-35.

11. The process of claim 1 wherein said zeolite is HZSM-23 associated with zinc.

12. The process of claim 1 wherein said zeolite is HZSM-23 associated with palladium.

* * * * *